United States Patent Office 3,506,355
Patented Apr. 14, 1970

3,506,355
COMPACT ARRANGEMENT OF TWO OPTICAL OBJECTIVES FOR TRANSMITTING AND RECEIVING RADIATION
Heinrich Nagel, Karlsruhe, Germany, assignor to Eltro GmbH & Co., Heidelberg, Germany
Filed Nov. 8, 1965, Ser. No. 506,625
Claims priority, application Germany, Nov. 14, 1964,
E 28,137
Int. Cl. G01c *3/08;* G02b *17/00*
U.S. Cl. 356—4                                  1 Claim

ABSTRACT OF THE DISCLOSURE

An optical system for transmitting and receiving an electromagnetic radiation consisting of a lens arrangement having a circular cross-sectional surface divided into two zones, the one zone being intended for transmitting radiation and being constituted by a circular edge zone inside the said circular cross-sectional surface and being spaced from the center axis of the said optical system, the other zone being intended for reception of radiation and being constituted by the balance of the said circular cross-sectional surface, the diameter of the said zone intended for transmission being smaller than the diameter of the said zone intended for reception.

---

This invention relates to optical systems for transmitting and receiving electromagnetic radiation and more particularly to systems from which, for example, radiation of the optical wavelength range is to be transmitted and into which incident radiation such as, for example, reflected radiation can also enter.

Such type of optical system can be used for instruments which are adapted to fulfill several functions; i.e., they may be used, for example, for simultaneously observing, aiming, sighting or measuring. These instruments are, accordingly, multi-circuit instruments.

As far as such instruments are known in the art, they generally comprise a plurality of different optical transmitting and receiving systems, or else, a single optical system is alternately used for the different methods of work, in which case beam splitters and deflecting mirrors may be combined with the optical transmitting and receiving systems. These known arrangements require considerable expenditure and are, in part, of complicated construction, in addition to which radiation losses due to the use of partially permeable mirrors, etc., must be accepted.

In order to avoid these disadvantages and to simplify the method of functioning of the above-described instruments, the invention proposes an optical system for transmitting and receiving electromagnetic radiation, consisting of a lens arrangement having a circular cross-sectional surface divided into two zones, the one zone being intended for transmitting radiation and being constituted by a circular edge zone inside the said circular cross-sectional surface and being spaced from the center axis of the said optical system, the other zone being intended for reception of radiation and being constituted by the balance of the said circular cross-sectional surface, the diameter of the said zone intended for transmission being smaller than the diameter of the said zone intended for reception.

This means that this system allows radiation to enter and emerge simultaneously, without the functions of the device in question, which are related to the entering and emerging of the radiation, being able to interfere with each other. The optical system according to the invention is a unit.

In addition to a spatially very favorable construction, such an optical system has the additional advantage that it allows optimal utilization of the total available optical entrance and/or exit surfaces.

Other features of the optical system according to the invention will be explained by way of the accompanying drawings, which illustrate embodiments of the invention and in which.

Figure 1:
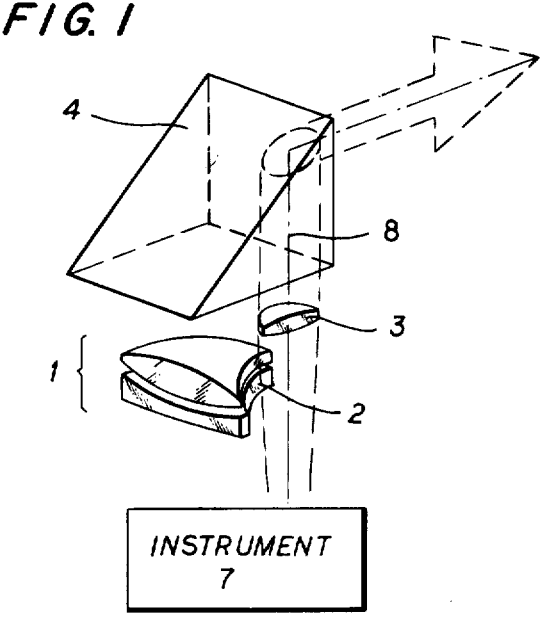
FIGURES 1 and 2 show optical systems developed according to the invention, combined with a deflecting prism.
Figure 4:
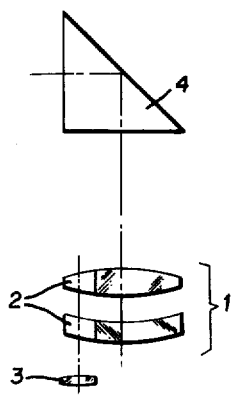
FIGURE 4 is a longitudinal section through the optical system.
Figure 2:
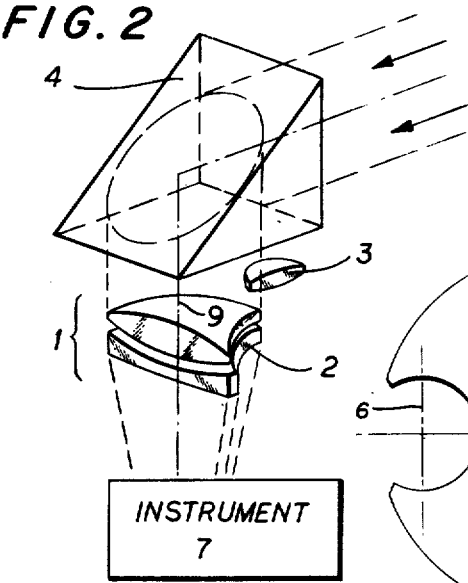

According to FIGS. 1, 2 and 4, the optical system consists of a lens group 1 which comprises an eccentric, marginal, peripheral opening or cut-out 2. Arranged above or below said opening 2 is another lens 3, whose diameter is approximately equal to that of the circular opening 2.

Figure 3:
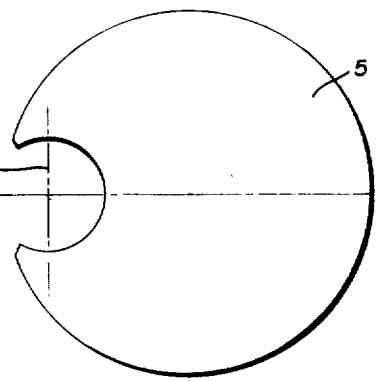
FIGURE 3 is a cross-sectional view of an optical system developed according to the invention.

The arrangement also comprises a deflecting prism 4 which forms, for example, the closure of an associated instrument to the outside and which deflects the entire incident or emerging radiation at a right angle. The cross-sectional area of the lens group 1 is divided, according to FIG. 3, into two regions or areas 5 and 6 arranged eccentrically with respect to each other, and the cross-sectional areas of said regions 5 and 6 are approximately circular. The diameter of the region or area 6 is about one-quarter that of the region 5. Thus, the region 6 corresponds to the opening 2 in FIGS. 1, 2 and 4. As is apparent from FIGS. 1 and 2, the opening 2 of the lens group 1 is used for transmitting radiation, while the remaining region or area of the cross-sectional area, i.e., the region 5 according to FIG. 3, is used for receiving radiation. The lens 3 arranged above or below the opening 2 serves for the separate focusing or bunching of the transmitting ray.

Such an optical system can be used with special advantage for an instrument 7 of known type which operates, for example, with normal light-optical radiation and with coherent radiation (Laser radiation). The instrument may, for example, be designed for measuring the distance of objects by means of Laser radiation and for the simultaneous visual observation of objects in daylight. In such a case, the optical system, in the development according to the invention, is combined as an objective lens or lens assembly with the measuring and observation device in such a manner that the circular opening 2 can be used for transmitting the Laser ray and the remaining area or region can be used for receiving visible radiation as well as the reflected scattered Laser radiation.

Preferably, the region or area of the optical system used for the reception will then form a component part of an optical image-forming system for visible radiation. The scattered Laser radiation which also enters the system is separated in the interior of the instrument, in the further course of the ray path, for example, by means of a dividing mirror and is used for separate evaluation.

In FIG. 1 it will be noted that the lens means 3 defines an optical axis 8, whereas in FIG. 2 it is to be noted that the lens group or means 1 defines an optical axis 9. These axes are preferably parallel and the prism 4 is such as to encompass both of the said axes. The prism 4 is thus adapted for transmission and reception of electromagnetic radiation by respective of the lens means.

There will now be obvious to those skilled in the art many modifications and variations of the structure set forth above. These modifications and variations will not depart from the scope of the invention if defined by the following claims.

What is claimed is:

1. An apparatus for range finding by means of laser-radiation and for simultaneous observing and aiming, said apparatus comprising: an instrument having means for producing laser-radiation and means for receiving light radiation inclusive of reflected laser-radiation, a right angle prism, which forms the closure of the apparatus to the outside, for reflecting by 90° the produced laser-radiation and emitting the same out of the apparatus and for receiving the incoming light radiation and reflecting the same by 90° to said instrument, an optical system disposed between said instrument and said right angle prism and comprising a two element objective lens for receiving incoming rays from the prism and transmitting the same to said instrument, said two element objective lens having a circular cross-sectional surface with a central optical axis and a marginal circular aperture at the periphery thereof, said aperture having a diameter which is substantially one-fourth the diameter of the objective lens, and a single element objective lens having a cross-sectional shape the same as said aperture and aligned therewith for transmitting laser-radiation from the instrument to said prism, said single element objective lens being offset in a longitudinal direction along the lens axis away from said two element objective lens to form a space therebetween.

References Cited

UNITED STATES PATENTS

| | | | |
|---|---|---|---|
| 2,025,892 | 12/1935 | Polackoff | 350—194 |
| 3,327,585 | 6/1967 | Vargady | 350—194 |
| 3,405,994 | 10/1968 | Altman et al. | 350—202 |
| 1,763,482 | 6/1930 | Scheppmann | 350—202 |
| 2,109,596 | 3/1938 | Plahn | 350—169 |
| 2,257,676 | 9/1941 | Gance et al. | 350—194 |

DAVID SCHONBERG, Primary Examiner

R. J. STERN, Assistant Examiner

U.S. Cl. X.R.

350—194, 202, 235